(12) United States Patent
Chandran et al.

(10) Patent No.: US 9,846,520 B2
(45) Date of Patent: *Dec. 19, 2017

(54) SYSTEM AND METHOD OF COMMUNICATION BETWEEN A CAPACITIVE TOUCH SCREEN AND AN ACTIVE STYLUS

(71) Applicant: STMicroelectronics Asia Pacific Pte Ltd, Singapore (SG)

(72) Inventors: Praveesh Chandran, Singapore (SG); Baranidharan Karuppusamy, Singapore (SG); Giuseppe Noviello, Singapore (SG); Chee Weng Cheong, Singapore (SG); Leonard Dinu, Singapore (SG); Dianbo Guo, Singapore (SG); Kien Beng Tan, Singapore (SG); Chaochao Zhang, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,294

(22) Filed: Jun. 7, 2017

(65) Prior Publication Data

US 2017/0269740 A1    Sep. 21, 2017

Related U.S. Application Data

(63) Continuation of application No. 14/461,977, filed on Aug. 18, 2014, now Pat. No. 9,703,433.

(51) Int. Cl.
*G06F 3/045* (2006.01)
*G06F 3/044* (2006.01)
*G06F 3/041* (2006.01)
*G06F 3/038* (2013.01)
*G06F 3/0354* (2013.01)

(52) U.S. Cl.
CPC ............ *G06F 3/044* (2013.01); *G06F 3/0383* (2013.01); *G06F 3/03545* (2013.01); *G06F 3/0416* (2013.01)

(58) Field of Classification Search
CPC ...... G06F 3/044; G06F 3/046; G06F 3/03545; G06F 3/0383
USPC ...................................................... 178/19.03
See application file for complete search history.

(56) References Cited

U.S. PATENT DOCUMENTS

| 5,007,085 A | 4/1991 | Greanias et al. |
| 8,432,170 B1 | 4/2013 | Walsh et al. |
| 8,481,872 B2 | 7/2013 | Zachut |
| 8,773,405 B1 | 7/2014 | Ryshtun et al. |
| 2008/0238885 A1 | 10/2008 | Zachut et al. |

(Continued)

*Primary Examiner* — Amare Mengistu
*Assistant Examiner* — Crystal A Mathews
(74) *Attorney, Agent, or Firm* — Gardere Wynne Sewell LLP

(57) ABSTRACT

An active stylus is capacitively coupled to a capacitive touch panel for communication. The active stylus operates in a wait mode to receive initial communications from the panel. In response to such receipt, the active stylus synchronizes to a repeating communications frame implementing time division multiplexing. Communications from the active stylus to the panel include: information communications; synchronization communications and communications specific for columns and/or rows of the panel. Communications from the panel to the active stylus may be addressed uniquely to the stylus or commonly to a group of styluses.

22 Claims, 7 Drawing Sheets

(56) References Cited

U.S. PATENT DOCUMENTS

| | | |
|---|---|---|
| 2010/0155153 A1 | 6/2010 | Zachut |
| 2012/0050231 A1 | 3/2012 | Westhues et al. |
| 2012/0113753 A1 | 5/2012 | Miyamoto et al. |
| 2012/0242603 A1 | 9/2012 | Engelhardt et al. |
| 2012/0327040 A1 | 12/2012 | Simon et al. |
| 2012/0327041 A1 | 12/2012 | Harley et al. |
| 2012/0331546 A1 | 12/2012 | Falkenburg et al. |
| 2013/0100071 A1 | 4/2013 | Wright et al. |
| 2013/0106714 A1 | 5/2013 | Shahparnia et al. |
| 2013/0106722 A1 | 5/2013 | Shahparnia et al. |
| 2013/0106725 A1 | 5/2013 | Bakken et al. |
| 2013/0154956 A1 | 6/2013 | Tudosoiu |
| 2013/0207926 A1 | 8/2013 | Kremin et al. |
| 2013/0207938 A1 | 8/2013 | Ryshtun et al. |
| 2014/0028577 A1 | 1/2014 | Krah et al. |
| 2014/0078096 A1 | 3/2014 | Tan et al. |
| 2014/0176495 A1 | 6/2014 | Vlasov |
| 2014/0210781 A1 | 7/2014 | Stern |
| 2014/0232699 A1 | 8/2014 | Viswanathan et al. |
| 2014/0267147 A1 | 9/2014 | Buelow et al. |
| 2015/0029136 A1 | 1/2015 | Shahparnia |
| 2015/0035797 A1 | 2/2015 | Shahparnia |
| 2015/0091859 A1 | 4/2015 | Rosenberg et al. |
| 2015/0153845 A1 | 6/2015 | Chang et al. |
| 2015/0177868 A1 | 6/2015 | Morein et al. |
| 2015/0193033 A1 | 7/2015 | Westhues |
| 2015/0199036 A1 | 7/2015 | Akitomo et al. |
| 2015/0242043 A1 | 8/2015 | Oda |
| 2015/0286297 A1 | 10/2015 | Cheong et al. |
| 2016/0018921 A1 | 1/2016 | Matlick et al. |
| 2016/0117047 A1 | 4/2016 | Dinu et al. |

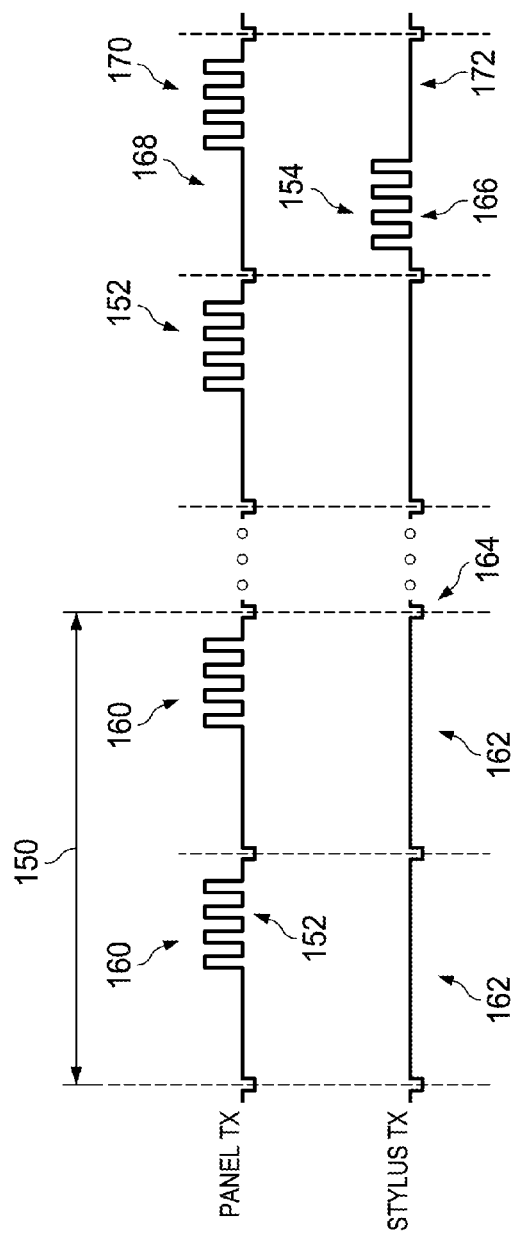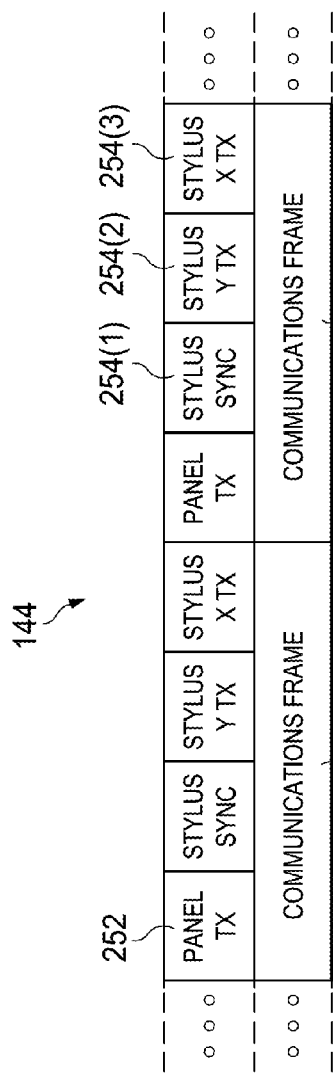

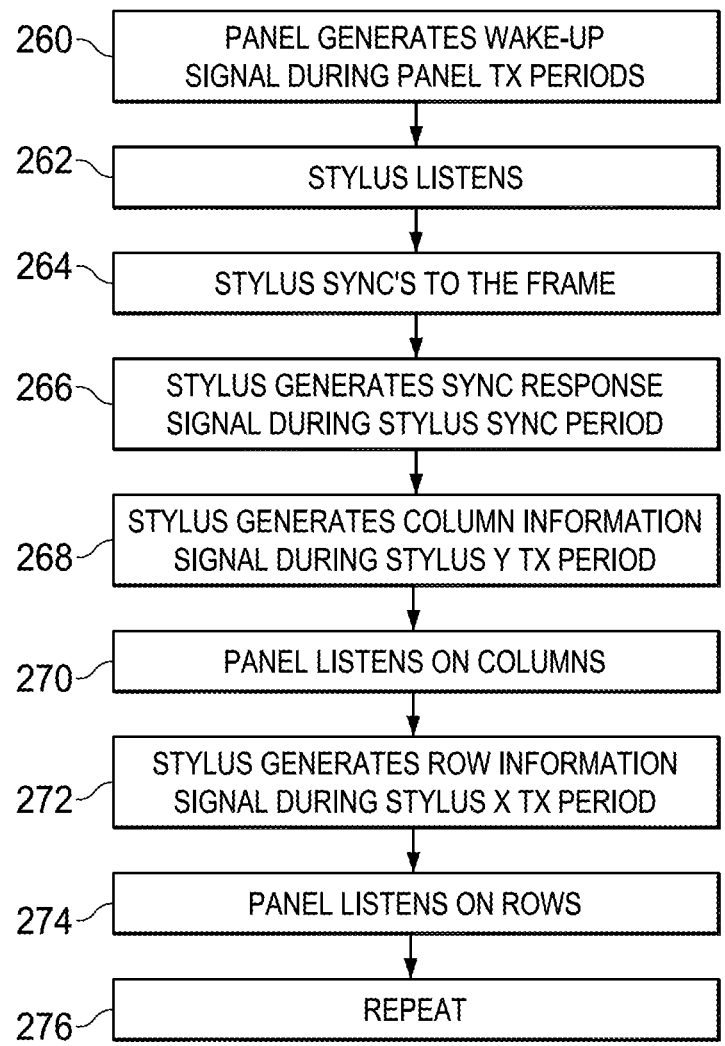

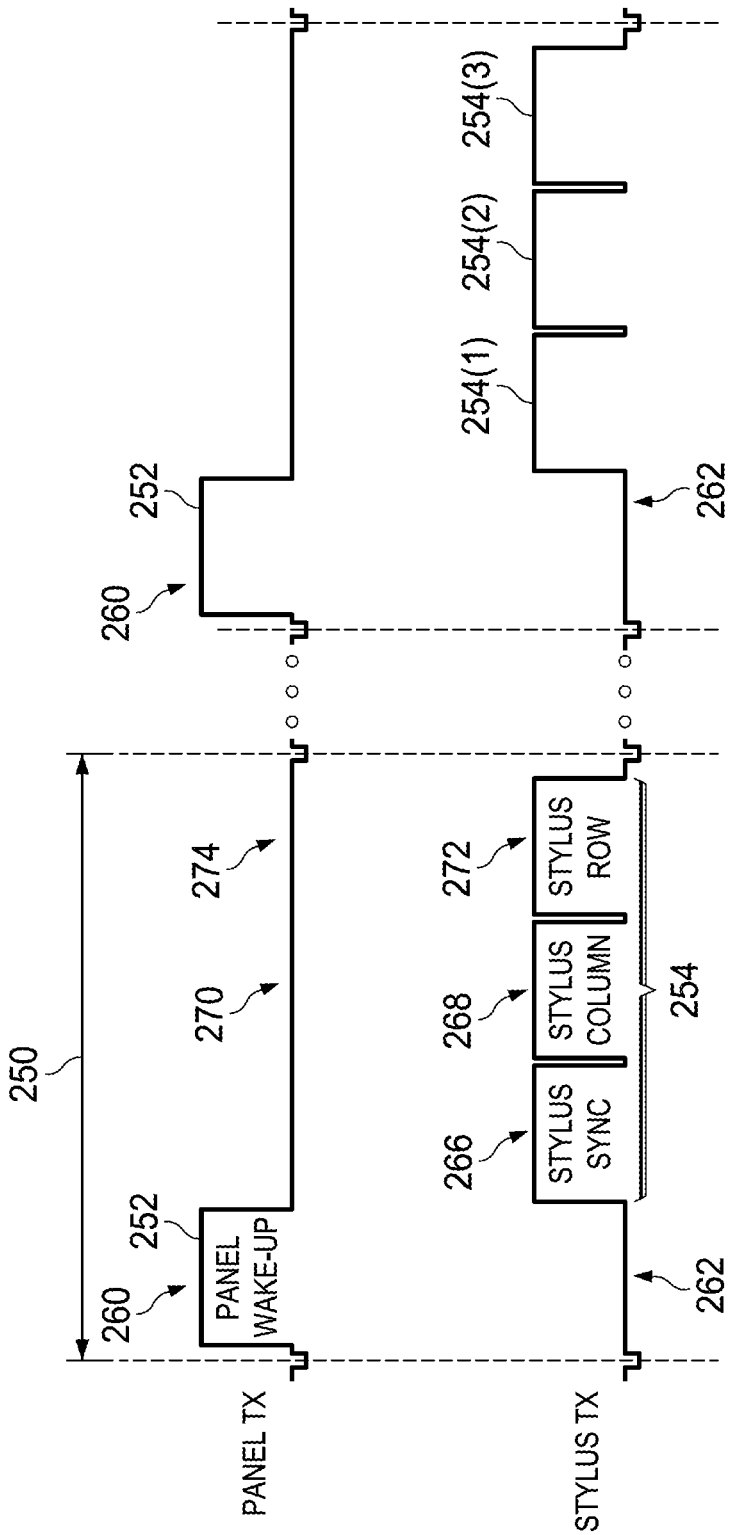

SYSTEM AND METHOD OF COMMUNICATION BETWEEN A CAPACITIVE TOUCH SCREEN AND AN ACTIVE STYLUS

CROSS REFERENCE TO RELATED APPLICATION

This application is a continuation of U.S. application for patent Ser. No. 14/461,977 filed Aug. 18, 2014, the disclosure of which is incorporated by reference.

FIELD OF THE INVENTION

The present disclosure generally relates to a system including a capacitive touchscreen panel and a stylus and, more particularly, to the communication of information between the capacitive touchscreen panel and stylus.

BACKGROUND

Touchscreen panels are typically incorporated in various electronic devices to detect a user input (i.e., user touch or hover) and to display content. The touchscreen panel includes an active portion capable of detecting the user touch/hover and displaying content. This active portion is typically formed from a display panel on top of which a capacitive sensing panel is provided which includes multiple layers of capacitive sensing circuitry arranged in a pattern.

FIG. 1 illustrates a capacitive sensing panel 100 utilizing a diamond-shaped pattern. The capacitive sensing panel 100 is of a type useful for a touchscreen panel for an electronic device such as a smart phone, GPS device, tablet computer, mobile media player, remote control device, or any other device capable of using a touchscreen panel. The sensing panel 100 includes an active portion 110 including a sensor pattern configured to assist in the detection of a user touch or hover (for example, through a finger or other body part as well as through a tool such as a stylus). The touchscreen panel 100 is formed from multiple ITO layers, namely, first ITO layer 112 and second ITO layer 114, disposed within the perimeter of the active portion 110. The first and second ITO layers 112 and 114 are separated by a dielectric layer 116. The first ITO layer 112 is patterned to include columns 115 of interconnected capacitive-sensing nodes 113, and a first layer of traces 115A coupled to each column of capacitive-sensing nodes 113 in the first ITO layer 112. The interconnected nodes 113 of any one column 115 are isolated from the interconnected nodes 113 of any adjacent column 115. The second ITO layer 114 is patterned to include rows 117 of interconnected capacitive-sensing nodes 113, and a second layer of traces 115B coupled to each row 117 of capacitive-sensing nodes 113 in the second ITO layer 114. The interconnected nodes 113 of any one row 117 are isolated from the interconnected nodes 113 of any adjacent row 117.

In the illustrated implementation, the interconnected nodes 113 have a diamond shape formed by a square rotated by forty-five degrees which allows for an interleaving of the row and column patterns to occupy a large surface area of the active portion 110. Thus, the space between four interconnected nodes 113 in two adjacent rows 117 is occupied by one node 113 of a given column. Conversely, the space between four interconnected nodes 113 in two adjacent columns 115 is occupied by one node 113 of a given row.

The first and second layers of traces 115A and 115B couple each respective row or column of capacitive-sensing nodes 113 to control circuitry 120. The control circuitry 120 may include drive and sense circuitry coupled to the traces 115A and/or 115B. For example, drive circuitry may be used to apply a signal to a trace 115A for a certain column and sense circuitry may be used to sense a signal on a trace 115B for a certain row. The opposite application of applying and sensing signals may, of course, also be provided using the control circuitry 120.

It is known in the art to operate the sensing panel in a number of distinct modes.

A first mode, referred to herein as a self-capacitance mode, configures the control circuitry 120 to sense the capacitance between any given column or row of interconnected nodes 113 and a surrounding panel reference (for example, ground). By sensing a change in self-capacitance for a given column or row of interconnected nodes 113, the control circuitry 120 may detect a user touch or hover at or near that given column or row of interconnected nodes 113.

A second mode, referred to herein as the mutual-capacitance mode, configures the control circuitry 120 to sense the capacitance at an intersection point between one column of interconnected nodes 113 and one row of interconnected nodes 113. By sensing a change in mutual-capacitance at a given intersection point between a column and row of interconnected nodes 113, the control circuitry 120 may detect a user touch or hover at or near that given intersection point.

It is further known in the art to provide a stylus 130 for use with the capacitive sensing panel 100. In a passive operating mode, the stylus 130 functions in a manner analogous to a user finger with respect to interacting with the capacitive sensing panel 100. In this regard, a change in capacitance (either self- or mutual-) is detected in response to the touch or hover of the stylus 130. In an active operating mode, however, the stylus 130 is configured to generate a signal 132 which can modify the charge on the nodes 113 of the capacitive sensing panel by means of capacitive coupling. If the stylus signal 132 is modulated by information (data), then the charge of the nodes 113 will likewise be modulated in accordance with that information and the modulated change in charge at the nodes can be detected (sensed) by the control circuitry 120 to recover the information sent by the stylus 130 in the signal 132.

The control circuitry 120 can be configured to drive a signal on the interconnected nodes 113 of the columns 115 and/or rows 117 of the capacitive sensing panel to place a charge on the nodes 113 which is capacitively coupled to the stylus. If the control circuitry signal is modulated by information (data), then the charge of the nodes 113 will likewise be modulated in accordance with that information and the modulated change in charge at the nodes can be detected (sensed) by the active stylus 130 to recover the information sent by the control circuitry 120.

It is thus possible for the control circuitry 120 and active stylus 130 to engage in a bidirectional communication. Establishing a protocol governing such a bidirectional communication is critical to supporting a cooperative relationship between the control circuitry and the active stylus 130. It is also important that the protocol support operation of the capacitive sensing panel 100 in non-stylus operations, such as detecting a user finger or hover, in a manner that is perhaps simultaneous with active stylus communication. It is further important that the protocol support operation of the capacitive sensing panel 100 with respect to communicating with a plurality of active styluses.

SUMMARY

In an embodiment, a method comprises: sending through a capacitive touch panel of a first signal during a first period of a repeating frame; receiving by an active stylus capacitively coupled to the capacitive touch panel of the first signal; sending by the active stylus of a second signal during a second period of said repeating frame; and receiving through the capacitive touch panel of the second signal.

In an embodiment, a method comprises: receiving by an active stylus capacitively coupled to a capacitive touch panel of a first signal transmitted through the capacitive touch panel during a first period of a repeating frame; and sending by the active stylus of a second signal during a second period of said repeating frame for communication through the capacitive touch panel.

In an embodiment, a method comprises: sending using a capacitive touch panel of a first signal during a first period of a repeating frame to an active stylus capacitively coupled to the capacitive touch panel; and receiving from the active stylus through the capacitive touch panel of a second signal during a second period of said repeating frame.

In an embodiment, a system comprises: a capacitive touch panel including a plurality of column lines and a plurality of row lines; an active stylus configured to be capacitively coupled to the capacitive touch panel, said active stylus operating to generate a communications signal including a stylus column signal communicating a first data set and a stylus row signal communicating a second data set; wherein said capacitive touch panel includes a control circuit operating to configure the plurality of column lines and the plurality of row lines of the capacitive touch panel in a self-capacitance mode of operation where the stylus column signal communicating the first data set is received only by the plurality of column lines and the stylus row signal communicating the second data set is received only by the plurality of row lines.

In an embodiment, a capacitive touch panel comprises: a plurality of column lines and a plurality of row lines and configured to be capacitively coupled to an active stylus; and a control circuit operating to configure the plurality of column lines and the plurality of row lines of the capacitive touch panel in a self-capacitance mode of operation to receive a communications signal from the active stylus which includes a stylus column signal communicating a first data set and a stylus row signal communicating a second data set, where the stylus column signal communicating the first data set is received only by the plurality of column lines and the stylus row signal communicating the second data set is received only by the plurality of row lines.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which:

FIG. 5 illustrates a timing diagram for the protocol of FIG. 4;

FIG. 6 illustrates another embodiment of an operating protocol for the bidirectional communication mode;

FIG. 7 illustrates a flow diagram for an implementation of the communication protocol useful for bidirectional communication mode;

FIG. 8 illustrates a timing diagram for the protocol of FIG. 7;

DETAILED DESCRIPTION OF THE DRAWINGS

Figure 1:
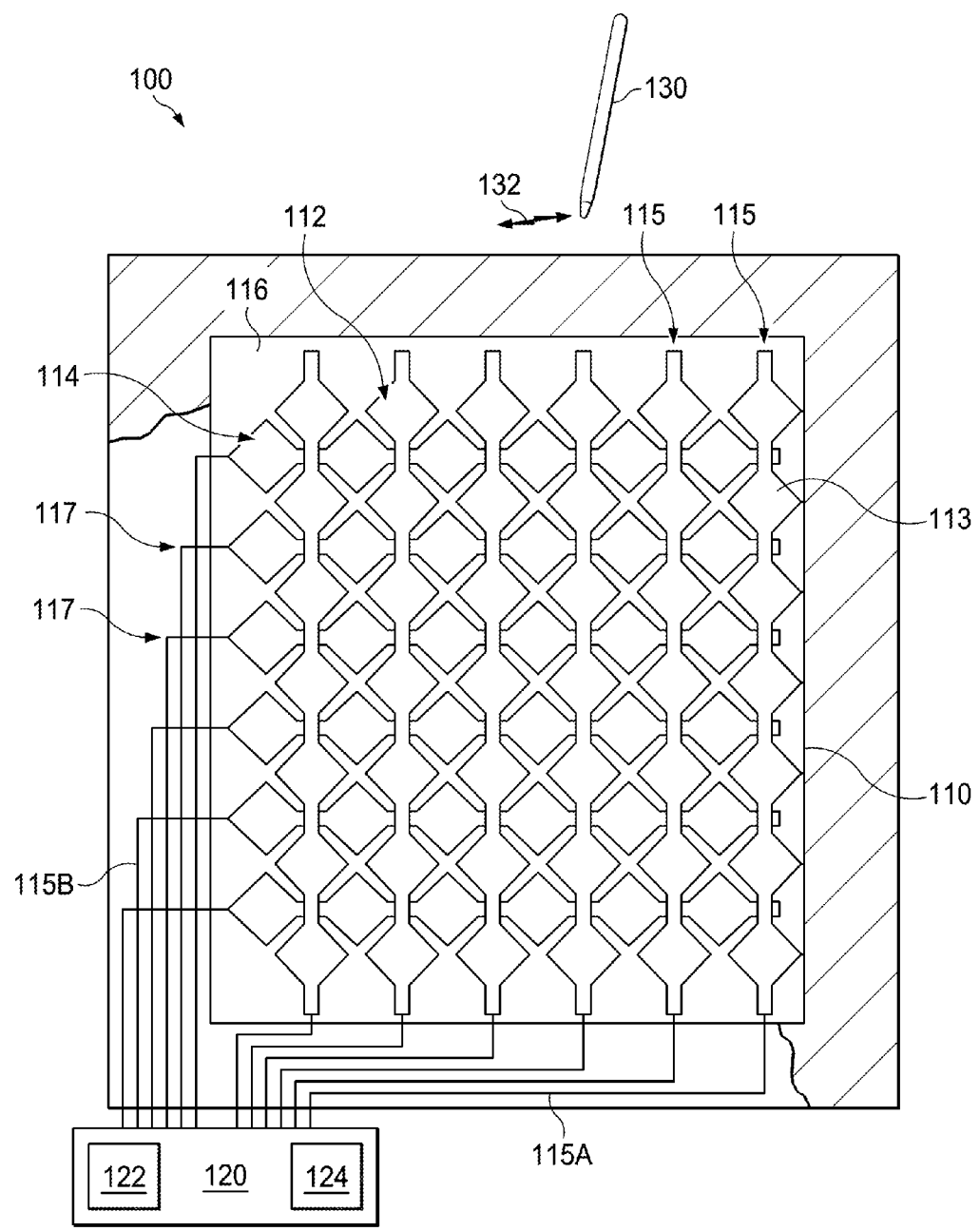
FIG. 1 illustrates a capacitive sensing panel of a touchscreen along with an active stylus.
Figure 2:
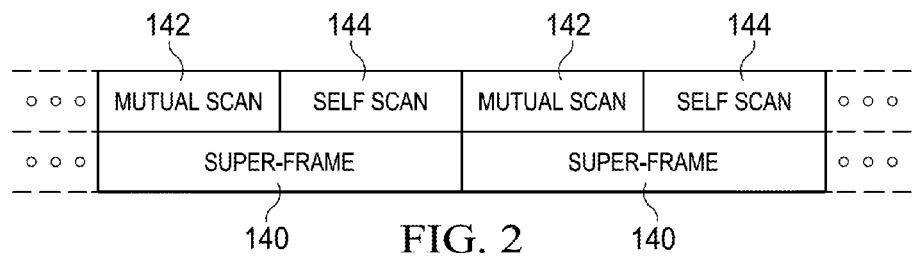
FIG. 2 illustrates an embodiment of an operating protocol for the capacitive sensing panel of FIG. 1.

Reference is now made to FIG. 2 which illustrates an embodiment of an operating protocol for the capacitive sensing panel 100 of FIG. 1. The operating protocol takes advantage of the fact that the same configuration of interconnected capacitive-sensing nodes 113 supports operation of the capacitive sensing panel 100 in both the mutual-capacitance mode and the self-capacitance mode. A time-division multiplexed operation is provided in accordance with a repeating super-frame 140, wherein each super-frame 140 is divided into one or more mutual-capacitance scan periods 142 and one or more self-capacitance scan periods 144. The control circuitry 120 includes a first circuit 122 (see, FIG. 1) which configures the columns 115 and rows 117 of interconnected capacitive-sensing nodes 113 to provide for mutual-capacitance sensing (as well known in the art) during the mutual-capacitance scan period 142 and a second circuit 124 (see, FIG. 1) which configures the columns 115 and rows 117 of interconnected capacitive-sensing nodes 113 to provide for self-capacitance sensing (as well known in the art) during the self-capacitance scan period 144. The periods 142 and 144 need not be of equal length. Indeed, in a preferred embodiment, the control circuit 120 sets the self-capacitance scan period 144 to last longer than the mutual-capacitance scan period 142. It is also possible for the control circuitry 120 to dynamically adjust the relative lengths of the mutual-capacitance scan period 142 and self-capacitance scan period 144 (based, for example, on whether an active stylus 130 is detected in proximity to the capacitive sensing panel 100). It is further possible for the control circuit 120 to respond to user programming or configuration for setting the relative lengths of the mutual-capacitance scan period 142 and self-capacitance scan period 144 in the control circuitry 120 (based, for example, on user preference).

During the mutual-capacitance scan period 140, the control circuitry 120 may operate to configure the rows 117 (for example) as force lines (referred to in the art as Y-force) and configure the columns 115 (for example) as sense lines (referred to in the art as X-sense). A force signal is sequentially applied by the control circuitry 120 to each row 117 of interconnected capacitive-sensing nodes 113 and the control circuitry 120 scans (for each forced row) sequentially across the columns 115 of interconnected capacitive-sensing nodes 113 to make capacitive sense measurements. After all rows and columns are scanned, the sensed mutual-capacitance measurements are then evaluated by the control circuitry 120 to make user presence (hover and/or touch) detections as well as determine the coordinates (location) of the presence detections. Within each mutual-capacitance scan period 142, the application of the force signals and the detection of the sense signals may be repeated any number of desired times.

During the self-capacitance scan period 144, two distinct operating modes are supported by the control circuitry 120. A first mode is a conventional self-capacitance measurement mode for making user presence (hover and/or touch) detections. In the self-capacitance measurement mode, the control circuitry 120 operates to scan the columns and rows and sense the self-capacitance of each column 115 and row 117 of interconnected capacitive-sensing nodes 113. The self-capacitance measurements are then evaluated by the control circuitry 120 to detect the presence and coordinates (location) of the user hover and/or touch.

Figure 3:
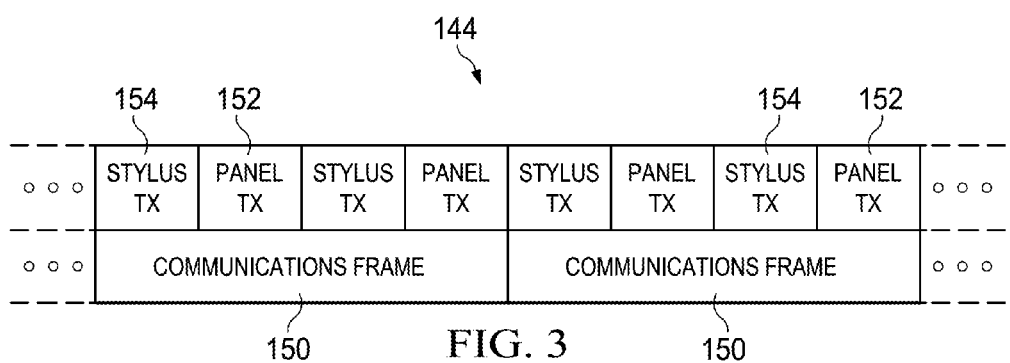
FIG. 3 illustrates an embodiment of an operating protocol for the bidirectional communication mode.

A second mode available during the self-capacitance scan period 144 is a communication mode used to communicate to and/or from the active stylus 130. Reference is now made to FIG. 3 which illustrates an embodiment of an operating protocol for the communication mode. As a general description, the communication mode comprises a time division multiplexed operation in accordance with a repeating communications frame 150, wherein each frame 150 includes at least one panel transmit period 152 and at least one stylus transmit period 154. During the panel transmit period 152, the control circuitry 120 drives a signal possibly modulated by information (data) on the interconnected nodes 113 of the columns 115 and/or rows 117 of the capacitive sensing panel. The active stylus 130 is capacitively coupled to the panel and operable to sense the panel transmit signal and recover any information contained in that signal. Conversely, during the stylus transmit period 154, the stylus 130 generates a signal possibly modulated by information (data) and capacitively coupled to the rows and columns of the panel. The control circuitry 120 of the panel functions to sense the capacitive change on nodes 113 and recover any information sent by the stylus 130. It will be understood that the illustration of two panel transmit periods 152 interleaved with two stylus transmit periods 154 in one frame 150 is exemplary only of a basic communications protocol.

The details of various implementations of the communication protocol of FIG. 3 used during the communication mode will now be described.

Figure 4:
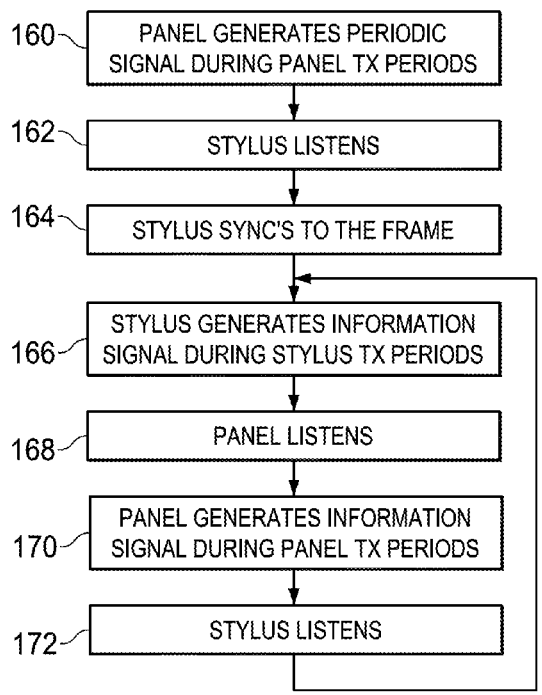
FIG. 4 illustrates a flow diagram for an implementation of the communication protocol useful for bidirectional communication mode.

Reference is now made to FIG. 4 which illustrates a flow diagram for an implementation of the communication protocol useful for the communication mode. A corresponding timing diagram is illustrated in FIG. 5. In step 160, the control circuitry 120 causes a periodic signal to be applied to each column 115 and row 117 of interconnected capacitive-sensing nodes 113 in accordance with the panel transmit periods 152. This signal transmission may, for example, comprise a wake-up or polling message, with the active stylus functioning in a sleep mode waiting for receipt of the message. In step 162, the stylus 130 (through its capacitive coupling to the panel) operates in a listen mode (including for example a low power or sleep mode) and senses change in capacitance at the nodes 113 due to the periodic signal applied by the panel control circuitry 120. From sensing the panel transmitted periodic signal during the periods 152, the stylus 130 is activated and functions to synchronize itself in step 164 to the communications frame 150 and thus know the timing location of the stylus transmit periods 154. In step 166, the stylus 130 generates an information signal for communication to the panel (through its capacitive coupling) during the stylus transmit period 154 of the time division multiplexed frame. The panel operates in a listen mode during the stylus transmit period 154 in step 168 and recovers the transmitted information. In step 170, the panel generates an information signal for communication to the stylus 130 during the panel transmit period 152. The stylus 130 (through its capacitive coupling to the panel) operates in a listen mode during the panel transmit period 152 in step 172 and recovers the transmitted information. The steps 166-172 are repeated in accordance with the self-scan frame 150 to support communication from the panel, communication from the stylus or bidirectional communication of information between the panel and stylus.

In an embodiment, the periodic signal may comprise a dedicated frequency (carrier) signal that is injected into each column 115 and row 117 of interconnected capacitive-sensing nodes 113 by the control circuitry 120. The periodic signal may, if desired, be modulated with information to be communicated to the stylus from the panel. In an embodiment, the periodic signal comprises a pulsed signal having a fixed pulse rate and duty cycle.

In an embodiment, the panel and stylus may each generate their respective information signals use phase shift key (PSK) modulation of a carrier signal so as to communicate information.

In an embodiment, the control circuitry 120 may utilize the received signal in panel listen mode (step 168) to make a stylus coordinate location determination. For example, during step 168, the control circuit 120 may operate to sequentially scan each column 115 and row 117 of interconnected capacitive-sensing nodes 113 to receive the stylus transmitted information signal. Signal strength measurements may be made by the control circuitry 120 with respect to each column and row (for example, by measuring the carrier strength after removal of the information modulation), and then the measured signal strengths are processed to determine coordinates of the stylus. This operation is analogous to the signal processing performed during conventional self-capacitance measurement to determine hover/touch location.

It will accordingly be recognized that the disclosed system supports touch sensing by means of mutual-capacitance (during the mutual scan period 142 of the super-frame 140), hover sensing by means of self-capacitance (during the self-scan period 142 of the super frame 140), and panel-stylus information communication and location sensing by means for self-capacitance (during the self-scan period 142 of the super frame 140 with communications frame 150).

Reference is now made to FIG. 6 which illustrates another embodiment of an operating protocol for the communication mode. As a general description, the communication mode comprises a time division multiplexed operation in accordance with a repeating communications frame 250, wherein each frame 250 includes a panel transmit period 252 and a plurality of stylus transmit periods 254. During the panel transmit period 252, the control circuitry 120 drives a signal possibly modulated by information (data) on the interconnected nodes 113 of the columns 115 and/or rows 117 of the capacitive sensing panel. The active stylus 130 is capacitively coupled to the panel and operable to sense the panel transmit signal and recover any information contained in that signal. Conversely, during the stylus transmit periods 254(1)-254(3), the stylus 130 generates a number of different signals each possibly modulated by information (data) and capacitively coupled to the rows and columns of the panel. The control circuitry 120 of the panel functions to sense the capacitive change on nodes 113 and recover any information sent by the stylus 130 in each of the signals.

Reference is now made to FIG. 7 which illustrates a flow diagram for an implementation of the communication protocol useful for bidirectional communication mode. A corresponding timing diagram is illustrated in FIG. 8. In step 260, the control circuitry 120 causes a wake-up signal to be applied by panel to each column 115 and row 117 of interconnected capacitive-sensing nodes 113 in accordance with the panel transmit periods 252. The wake-up signal may take the form of the periodic signal discussed above. The wake-up signal may be modulated to carry information if desired. In step 262, the stylus 130 (through its capacitive coupling to the panel) operates in a listen mode and senses change capacitance at the nodes 113 due to the wake-up signal applied by the panel control circuitry 120. From sensing the panel transmitted wake-up signal during the periods 252, the stylus 130 is able to synchronize itself in step 264 to the communications frame 250 and thus know the timing location of the stylus transmit periods 254(1)-254(3). In step 266, the stylus 130 generates a sync signal for communication to the panel (through its capacitive coupling) during the stylus sync transmit period 254(1) confirming synchronization to the panel and advising the panel to anticipate subsequent communication from the stylus. The sync signal may take the form of the periodic signal discussed above. The sync signal may be modulated to carry information if desired. The panel uses the received sync signal confirm stylus synchronization to the communications frame 250. In step 268, the stylus 130 generates a column information signal for communication to the panel (through its capacitive coupling) during the stylus Y transmit period 254(2). The column information signal may be modulated to include button and pressure information. The panel operates in a listen mode scanning columns 115 of the panel during the stylus Y transmit period 254(2) in step 270 and recovers the transmitted information which can be processed to make a stylus coordinate determination along the y-axis of the panel. In step 272, the stylus 130 generates a row information signal for communication to the panel (through its capacitive coupling) during the stylus X transmit period 254(3). The row information signal may be modulated to include button and pressure information. The panel operates in a listen mode scanning rows 117 of the panel during the stylus X transmit period 254(3) in step 274 and recovers the transmitted information which can be processed to make a stylus coordinate determination along the x-axis of the panel. The process of FIG. 7 is then repeated (step 276) in accordance with the frame.

There is a technical advantage to separating the stylus X and Y transmissions: the same circuitry (in the control circuitry 120) can be used to scan X and Y in time-multiplexed scanning, and thus less circuitry is needed at a cost savings. Additionally, the X and Y scanning is compatible to mutual and self-scan operations. If there are a total of 12-bits of data to be sent from the stylus, this data can be divided into two blocks and sent separately on the X and Y channels.

In an embodiment, the wake-up signal applied by panel to each column 115 and row 117 of interconnected capacitive-sensing nodes 113 in accordance with the panel transmit periods 152 and step 260 may be modulated to include stylus identification information (i.e., the identification of the stylus with whom the panel wishes to communicate). The stylus identification information may comprise an identification that is unique to a particular stylus or instead is more generic and applicable to a class or group of styluses. Any stylus proximate enough to the panel will receive the wake-up signal in step 262. The receiving stylus 130 functions to compare its stylus identification value to the stylus identification information included in the wake-up signal. If there is a match or correlation regarding identification, the stylus 130 will synchronize itself in step 264 to the communications frame 250 and generate the responsive sync signal for communication back to the panel confirming synchronization to the panel and advising the panel to anticipate subsequent communication from that stylus. Conversely, where there is no match or correlation regarding identification, the stylus ignores the wake-up signal.

The foregoing process facilitates the association of multiple styluses to a single panel. Such a feature is beneficial when the panel is provided with a system supporting applications and uses which would benefit from the use of different styluses. One example of this would be an art application where multiple styluses are provided, each stylus presenting a different artistic function such as, for example, different colors, different line widths, different shadings, different brush techniques, different media and the like. Another example of this would be a game application where multiple styluses are provided, each stylus being associated with a different game piece or token (such as with different chess pieces).

Figure 9:
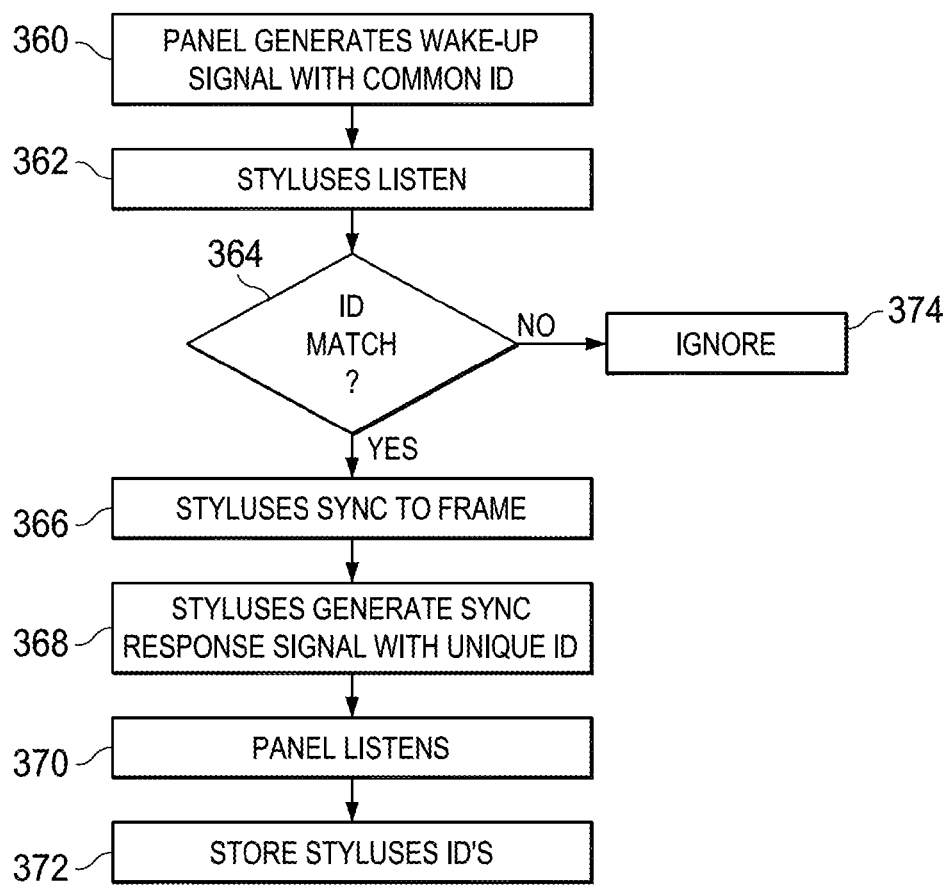
FIG. 9 illustrates a flow diagram for an initialization procedure for the communication protocol.

To facilitate a multiple stylus association, the control circuitry 120 must be able to identify each associated stylus. To accomplish this goal, an initialization or configuration (as with a pairing) operation as shown in FIG. 9 is executed where the stylus identification information in the wake-up signal sent in step 360 is shared in common by a class or group of styluses. Any stylus proximate enough to the panel will receive the wake-up signal in step 362. The receiving stylus 130 functions to compare its stylus identification value to the common identification information included in the wake-up signal (step 364). If there is a match or correlation regarding identification, the stylus 130 will synchronize itself in step 366 to the communications frame 250 and generate the responsive sync signal for communication back to the panel confirming synchronization to the panel in step 368. The responsive signal is modulated with information providing the unique identification of the responding stylus. The panel listens in step 370 and the control circuitry 120 is provided with the unique identification from the responding styluses. The unique identification of each responding stylus is stored (in step 372) so as to allow the control circuitry 120 to maintain a record of associated styluses and their identification values.

Figure 10:
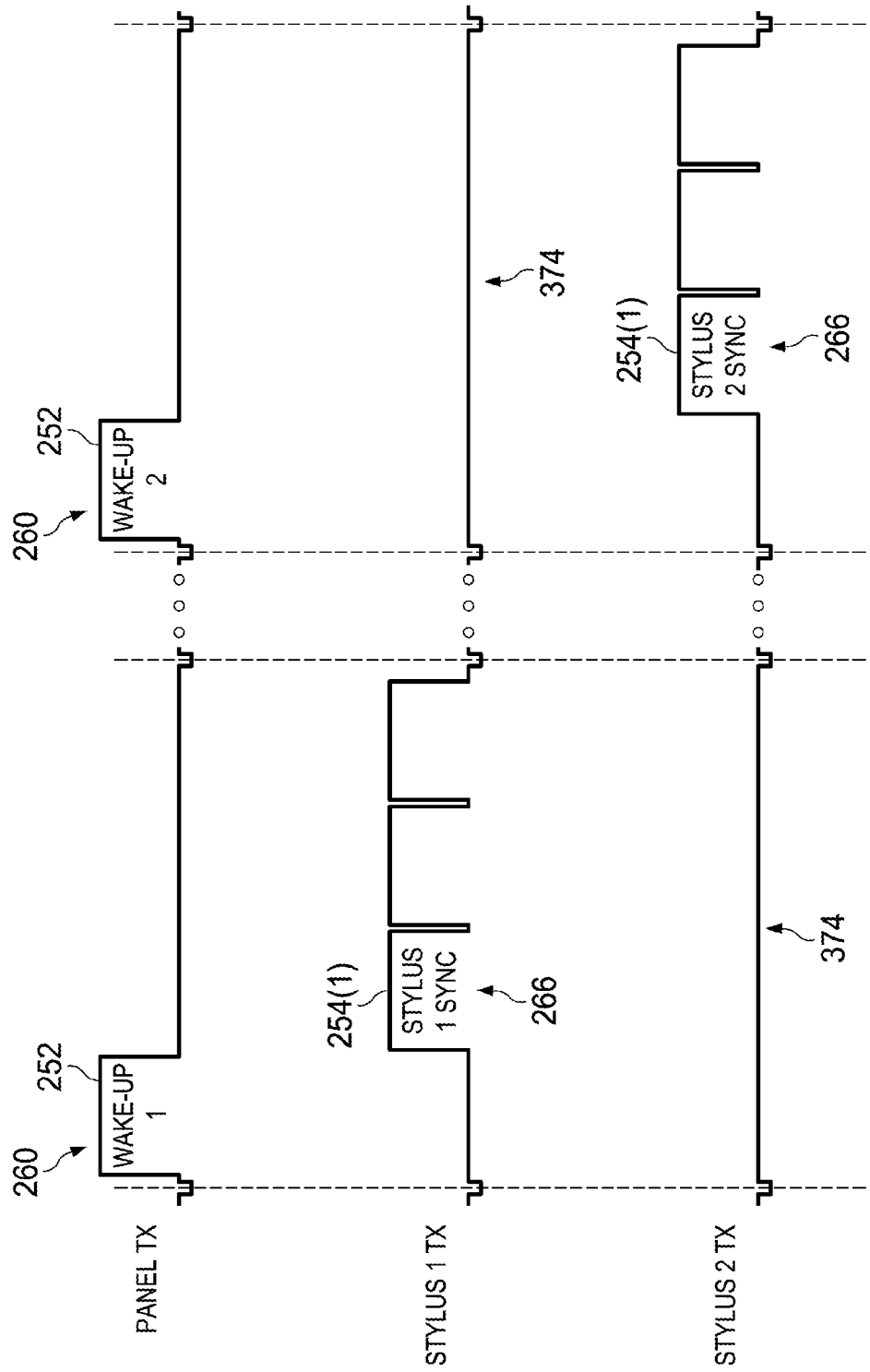
FIG. 10 illustrates a timing diagram for the protocol of FIG. 7 where multiple styluses are present.

After the initialization or configuration operation of FIG. 9 is completed, the process of FIG. 7 may be executed with the wake-up signals sent in step 260 modulated to include the unique identification information of particular styluses and thus control the conversation between the panel and each stylus. This operation is illustrated in the timing diagram of FIG. 10. The process of step 262 for having the stylus listen for the wake-up signal would further include, like that shown in step 364 of FIG. 9, an operation performed by the stylus to compare its stylus identification value to the unique identification information contained in the wake-up signal. The remaining steps of FIG. 7 would be performed by that stylus only if there was an identification match. In the absence of a match, in either FIG. 7 or FIG. 9, the stylus would ignore (step 374) the wake-up signal.

The transmission of the wake-up signal in step 360 of FIG. 9 is essentially a point to multi-point broadcast communication. It is possible that multiple styluses will receive the wake-up signal, satisfy the matching test of step 364, and want to generate the sync response signal in step 368. This raises a concern that multiple styluses will simultaneously communicate during a single stylus sync period 266. If such simultaneous communications occur from multiple styluses, there is a possibility of the signals stepping on each other and the control circuitry 120 may not receive stylus sync confirmations and stylus identification information. To avoid this, when the control circuitry 120 detects a first stylus, for example through analyzing the location of the stylus relative to the panel, the control circuitry will lock onto the stylus by scanning only the columns and rows of that location. When two styluses are close to each other to a degree prohibiting separation by the control circuitry, the control circuitry will ignore the styluses and generate wake up signals again as in step 360 of FIG. 9.

The general configuration of an active stylus 130 of the type used herein and well as the general configuration of a capacitive touch panel 100 is well known to those skilled in the art. Prior art styluses and panels are taught, for example, by U.S. Pat. No. 8,481,872; and United States Patent Application Publication Nos. 2012/0327040, 2012/0327041, 2012/0331546, 2013/0106725 and 2013/0154956, the disclosures of which are hereby incorporated by reference.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A system, comprising:
    a capacitive touch panel including a plurality of column lines and a plurality of row lines;
    an active stylus configured to be capacitively coupled to the capacitive touch panel, said active stylus operating to generate a communications signal including a stylus column signal communicating a first data set and a stylus row signal communicating a second data set;
    wherein said capacitive touch panel includes a control circuit operating to configure the plurality of column lines and the plurality of row lines of the capacitive touch panel in a self-capacitance mode of operation where the stylus column signal communicating the first data set is received only by the plurality of column lines and the stylus row signal communicating the second data set is received only by the plurality of row lines.

2. The system of claim 1, wherein communication between the capacitive touch panel and the active stylus is occurs using a repeating communications frame, said repeating communications frame including a first period during which communications from the capacitive touch panel to the active stylus are made and further including a second period during which communications from the active stylus to the capacitive touch panel are made.

3. The system of claim 2, wherein communications from the capacitive touch panel to the active stylus during the first period include a wake-up signal, said active stylus operating in response to receipt of the wake-up signal to generate said communications signal.

4. The system of claim 3, wherein the wake-up signal includes identification information common to a plurality of active styluses and wherein said communications signal includes identification information that is unique to the active stylus which generates the communications signal.

5. The system of claim 4, wherein the active stylus is further operable to compare the identification information common to the plurality of active styluses to the unique identification information, the active stylus sending said communications signal only if the common identification information corresponds to the unique identification information.

6. The system of claim 3, wherein the wake-up signal includes identification information specific to a certain active stylus and wherein the active stylus is further operable to compare the identification information specific to the certain active stylus to a unique identification of the active stylus, the active stylus sending said communications signal only if the specific identification information corresponds to the unique identification.

7. The system of claim 1, wherein the control circuit of the capacitive touch panel further operates to configure the plurality of column lines and the plurality of row lines of the capacitive touch panel in a mutual capacitance mode of operation.

8. The system of claim 7, wherein the control circuit of the capacitive touch panel further operates to periodically switch between the self-capacitance mode of operation and the mutual capacitance mode of operation.

9. The system of claim 8, wherein the control circuit is further operable to make touch detections and touch location determinations during the mutual capacitance mode of operation.

10. The system of claim 8, wherein the control circuit is further operable to make touch detections and touch location determinations during the self-capacitance mode of operation by processing signal strength measurements made on the received stylus column signal and stylus row signal.

11. The system of claim 1, wherein the control circuit of the capacitive touch panel operates in the self-capacitance mode of operation to:
    scan columns of the plurality of column lines during active stylus transmission of the stylus column signal; and
    scan rows of the plurality of row lines during active stylus transmission of the stylus row signal.

12. The capacitive touch panel of claim 11, wherein the control circuit of the capacitive touch panel further operates to configure the plurality of column lines and the plurality of row lines of the capacitive touch panel in a mutual capacitance mode of operation.

13. The capacitive touch panel of claim 12, wherein the control circuit of the capacitive touch panel further operates to periodically switch between the self-capacitance mode of operation and the mutual capacitance mode of operation.

14. The capacitive touch panel of claim 13, wherein the control circuit is further operable to make touch detections and touch location determinations during the mutual capacitance mode of operation.

15. The capacitive touch panel of claim 13, wherein the control circuit is further operable to make touch detections and touch location determinations during the self-capacitance mode of operation by processing signal strength measurements made on the received stylus column signal and stylus row signal.

16. The capacitive touch panel of claim 11, wherein the control circuit of the capacitive touch panel operates in the self-capacitance mode of operation to:
    scan columns of the plurality of column lines during active stylus transmission of the stylus column signal; and
    scan rows of the plurality of row lines during active stylus transmission of the stylus row signal.

17. The system of claim 1, wherein the active stylus operates to modulate said communications signal with information to be communicated from the active stylus to the capacitive touch panel.

18. A capacitive touch panel, comprising:
- a plurality of column lines and a plurality of row lines and configured to be capacitively coupled to an active stylus; and
- a control circuit operating to configure the plurality of column lines and the plurality of row lines of the capacitive touch panel in a self-capacitance mode of operation to receive a communications signal from the active stylus which includes a stylus column signal communicating a first data set and a stylus row signal communicating a second data set, where the stylus column signal communicating the first data set is received only by the plurality of column lines and the stylus row signal communicating the second data set is received only by the plurality of row lines.

19. The capacitive touch panel of claim 18, wherein communication between the capacitive touch panel and the active stylus is occurs using a repeating communications frame, said repeating communications frame including a first period during which communications from the capacitive touch panel to the active stylus are made and further including a second period during which communications from the active stylus to the capacitive touch panel are made.

20. The capacitive touch panel of claim 19, wherein communications from the capacitive touch panel to the active stylus during the first period include a wake-up signal configured to wake said active stylus from a low power operating mode.

21. The capacitive touch panel of claim 20, wherein the wake-up signal includes identification information common to a plurality of active styluses.

22. The capacitive touch panel of claim 20, wherein the wake-up signal includes identification information specific to a certain active stylus.

* * * * *